Oct. 20, 1959     B. J. BLUMBERG     2,909,321
AIR ESCAPE VALVE
Filed Jan. 17, 1958     2 Sheets-Sheet 1
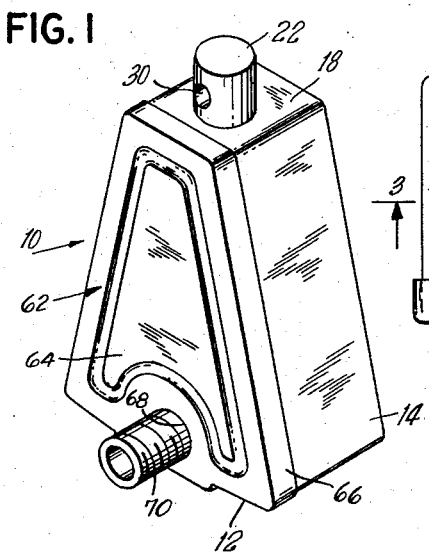
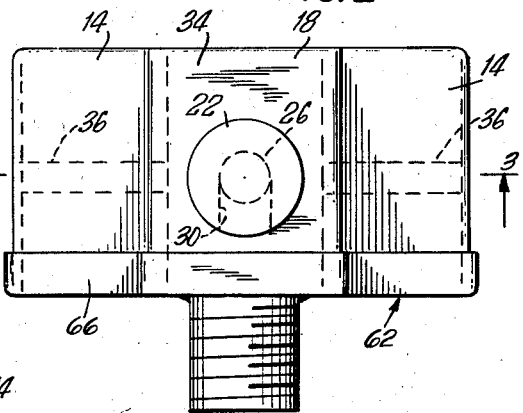
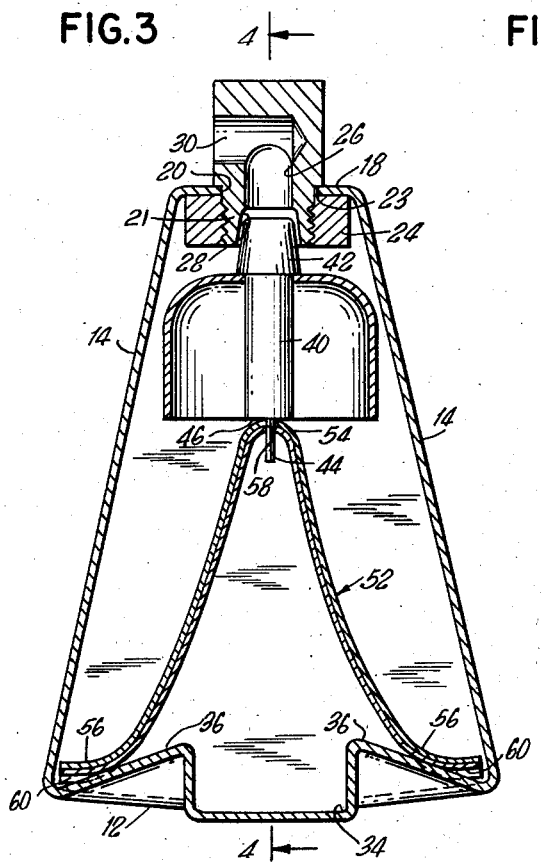
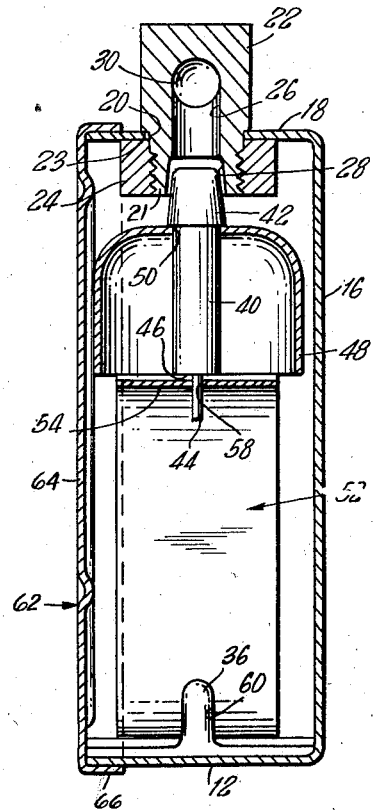
INVENTOR.
BENJAMIN J. BLUMBERG
BY
ATTORNEY Oct. 20, 1959   B. J. BLUMBERG   2,909,321
AIR ESCAPE VALVE
Filed Jan. 17, 1958   2 Sheets-Sheet 2
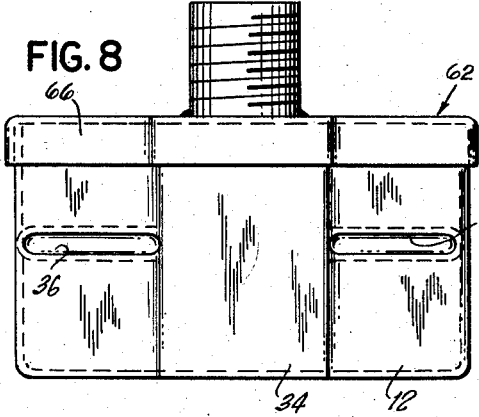
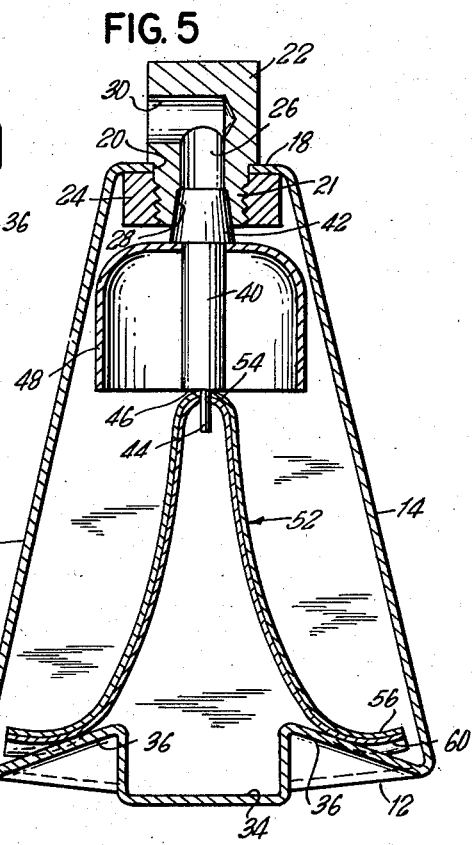
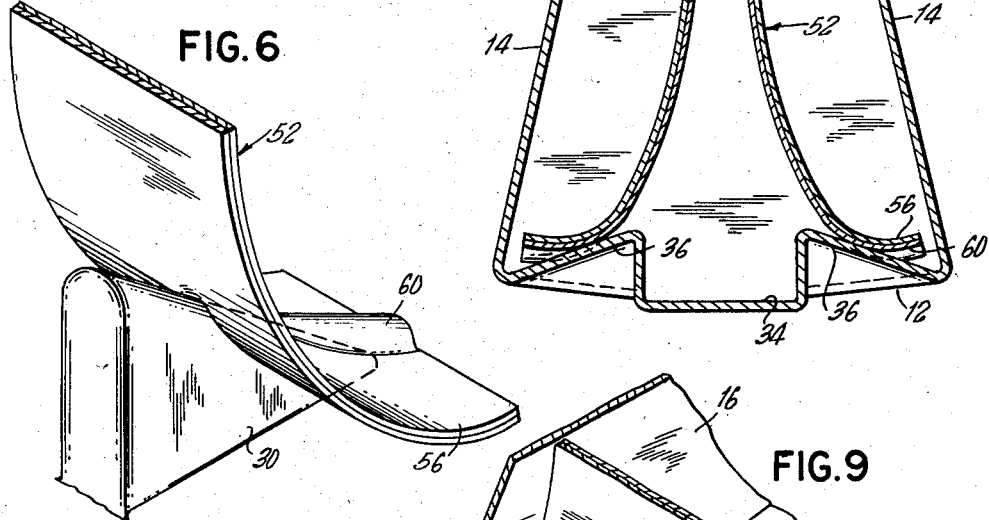
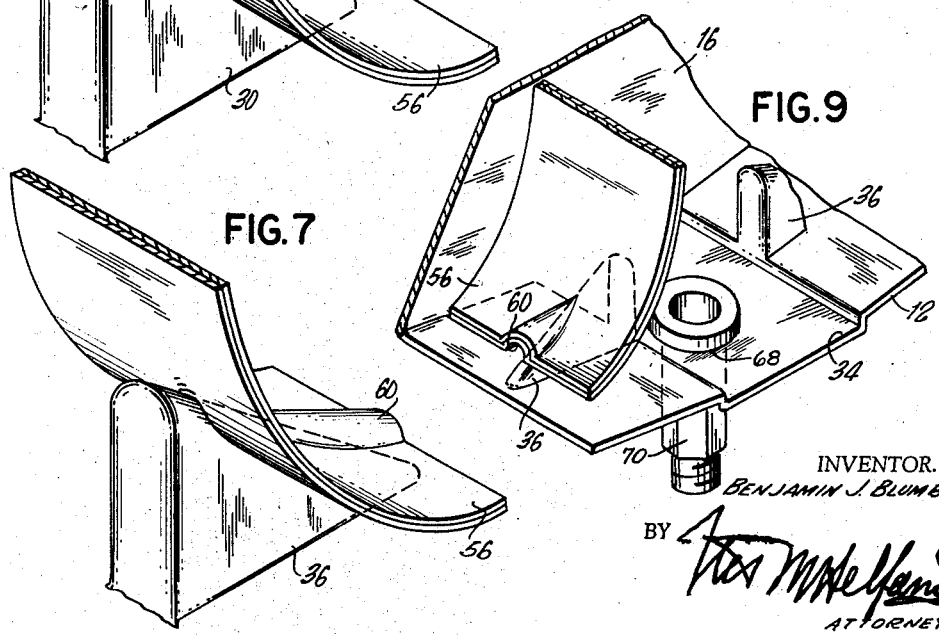
INVENTOR.
BENJAMIN J. BLUMBERG
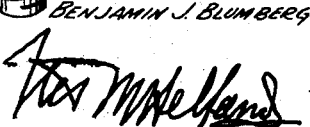
ATTORNEY United States Patent Office 2,909,321
Patented Oct. 20, 1959

2,909,321

AIR ESCAPE VALVE

Benjamin J. Blumberg, New York, N.Y.

Application January 17, 1958, Serial No. 709,496

9 Claims. (Cl. 236—62)

The present invention relates to an air-escape valve, such as a relief and pressure release valve, especially adapted for use with steam radiators, and particularly to a thermostatically controlled air-escape valve of the type utilizing a bimetallic element.

It is an object of the present invention to provide an air-escape valve of the character described, utilizing a bimetallic element, in which the movement of the bimetallic element into valve-shutting position, upon its being subjected to heat, is aided and magnified by a fixed mechanical structural means, to thereby make the valve action more positive, more certain and more effective.

It is another object of the present invention to provide an air-escape valve of the character described in which the bimetallic element is loosely associated directly with and solely connected to the valve stem, in a manner which simplifies and makes more economical the assembly of the device.

It is also an object of the present invention to provide an air-escape valve of the character described in which the bimetallic element is guided and steadied against tilting in the course of its valve shutting and opening movements in a manner that might bind it and hinder its effective action.

It is still another object of the present invention to provide a bimetallic thermostatic air-escape valve of the character described, in which the structural means that magnifies the valve shutting movement of the bimetallic element also serves as a means for guiding and steadying the element against tilting and binding.

It is a further object of the present invention to provide a bimetallic thermostatic air-escape valve of the character described that will also respond for closing to the pressure of a liquid that may inadvertently enter thereinto.

It is a still further object of the present invention to provide a bimetallic thermostatic air-escape valve of the character described which will permit the rapid and complete drainage of any liquid entering thereinto, to thereby eliminate substantially completely, the chances for "knocking" in the steam heating system in which it may be used, such as might result if the liquid were to remain in the valve.

It is yet a further object of the present invention to provide an air-escape valve of the character described which is formed of a minimum of relatively simple parts which may be readily and economically mass-produced and readily and economically assembled, and which is sturdy and durable and not likely to readily spoil or go out of order.

The foregoing and other objects and advantages of the air-escape valve of the present invention will become more readily apparent to those skilled in the art from the embodiment thereof shown in the accompanying drawings and from the description following. It is to be understood, however, that such embodiment is shown by way of illustration only, to make the principles and practice of the invention more readily comprehensible, and without any intent of limiting the invention to the specific details therein shown.

In the drawings:

Fig. 1 is a perspective view of one embodiment of an assembled air-escape valve of the present invention;

Fig. 2 is a top plan view of the same;

Fig. 3 is a section taken on line 3—3 of Fig. 2, with the valve shown in open, air releasing position;

Fig. 4 is a section taken on line 4—4 of Fig. 3;

Fig. 5 is a section similar to that of Fig. 3, with the valve shown in sealed position;

Fig. 6 is a fragmentary, enlarged, perspective view, showing the relative positions of an end of the bimetallic element and the guiding and raising shoulder therefor, when the valve is open;

Fig. 7 is a view similar to that of Fig. 6, showing the relative position of the bimetallic element end upon its supporting and guiding shoulder, when the valve is closed;

Fig. 8 is a bottom plan view of the valve of Fig. 1; and

Fig. 9 is a fragmentary, perspective view of a modified form of the valve, wherein the draining opening is formed in the bottom wall of the casing, instead of in a side wall or cover thereof, as shown in Fig. 1.

Generally stated, the valve of the present invention utilizes an inverted V-shaped or bell shaped bimetallic element, having a curved apex and flaring ends that ride on inwardly and upwardly slanting ramps or shoulders provided in the valve casing, and which is loosely secured by its apex directly to the valve stem, so that when the bimetallic element is subjected to heat, its two arms tend to straighten and to converge, to thereby move the valve stem into valve closing position and also, as they converge, to ride upwardly upon the ramps, to thereby magnify the movement of the valve stem into its valve shutting position.

In the preferred embodiment of the invention, the ramps or shoulders are in the form of relatively narrow rib embossments formed on the interior of the valve casing and the flaring end portions of the bimetallic element are each provided with a suitable and correspondingly shaped debossment on its inner surface which fits and engages slidably over its supporting ramp, to be steadied against tilting and to be guided in its movement over the ramp.

Referring now in greater detail to the accompanying drawings, the valve therein illustrated is shown to comprise a housing or casing, generally designated as 10, formed with a bottom wall, 12, side walls, 14, a rear wall, 16, and a top wall, 18, and having, preferably its front side open, to permit the easy access to the interior thereof that is necessary for the easy assembly of the other parts in and with the casing. Preferably, the casing 10 tapers upwardly, toward its top wall, so that its vertical section is trapezoid.

The top wall 18 of the casing has an opening, 20, formed therein, through which is inserted the reduced, threaded end, 21, of a plug, 22, such threaded end forming a shoulder, 23, that rests on the edge of the opening 20, and being engaged from the interior of the casing by a nut, 24, that secures the plug 22 in place. The plug 22 is provided with an air passageway consisting of a vertical or longitudinally extending portion, 26, from the end of the threaded plug portion 21 to a point thereabove and is formed with an outwardly flared, relatively deep end portion, 28, that forms a valve seat, and of a laterally extending portion, 30, that connects the inner end of the passageway portion 26 with the exterior of the plug.

The bottom wall 12 of the casing 10 is preferably of generally arcuate, outwardly bellying shape and is preferably formed with a transversely extending central well, 34, and with inwardly extending embossments, 36, formed on each side of the well 34, each slanting from and end of the bottom wall 12, upwardly toward the well 34; such embossments each forming a sloping ramp and being preferably formed with a rounded ridge, 36.

Disposed within the casing 10 is a valve stem, 40, having the elongated, tapered valve head, 42, at one end, that fits within the valve seat 28, and with a reduced end, forming a pin, 44, at its other end, that is defined by a shoulder, 46. The valve stem supports thereon, in overhanging relation, a cup-shaped member, 48, which is fitted thereover by its central opening, 50, and is secured thereto against the underside of the valve head 42, in any suitable manner, and may serve as a trap for liquid entering the valve casing to move the valve head into valve closing position, in the conventional manner.

The valve stem 40 is maintained in position in the upper part of the casing 10 with its valve head 42 disposed, at all times, within the valve seat 28 by a bimetallic element, 52, which is of generally inverted V-shape, preferably having a curved apex, 54, and outwardly flaring ends, 56, and which is formed with an opening, 58, at its apex, that engages over the reduced end or pin, 44, of the valve stem 42 and against the shoulder 46 with its flaring ends 56 resting upon the slanting shoulders or ramps 36.

The valve seat 28 formed in the plug 22 is of substantial depth, and the valve head 42 is of substantial height and the bimetallic element is of such height that under normal temperature conditions it will support the valve stem 40 with its tapering head 42 partly withdrawn from the valve seat 28, so that while the latter are interfitted, there is space provided between their facing walls to permit escape of air between them. However, when the bimetallic element 52 is heated to its critical temperature, both of its arms will tend to straighten and to converge, to thereby elongate them and also to cause them to ride or be translated upwardly upon the shoulders 36 formed in or on the bottom wall 12 of the casing 10, to thereby urge the valve stem 40 upwardly and push its head 42 into the valve seat 28 to close the valve.

To steady the freely-mounted bimetallic element 52 in the casing, the flared ends thereof 56 are each provided with an embossment 60 that fits over and engages the shoulder 36 which it rides.

The casing 10 is provided with a closure 62 consisting of a wall portion, 64, that may conform in shape to the shape of the casing 10 and is formed with a flange, 66, that may fit either within or without the casing 10, as may be desired, and may be suitably and fixedly secured thereto, as by soldering, to seal the casing.

The casing is also provided with an opening which may serve both as an inlet for air or steam from the heating system thereinto and also as an outlet for the return of the condensed steam or any fluid that may enter the casing from the heating system, back to the heating system. Such opening, 68, may be formed in one of the walls of the casing, as in the closure wall, 64, adjacent the bottom of the well 34, as shown in Fig. 1, or directly in the bottom of the well 34, as shown in Fig. 9. Such opening 68 may receive the conventional threaded nipple, 70, which may be secured thereto, in any conventional manner, and which serves to connect the casing to a radiator or the like.

It may here be stated that whenever the term "translated" is used in the claims, it is intended to advert to the bodily shifting of the bimetallic element within the casing, so that each part of it not only moves closer to the valve seat, but moves further away from the opposed end of the casing; as distinguished from the movement of the bimetallic element due directly to its change of shape.

The operation of the valve of the present invention is as follows:

Under normal temperature conditions, the bimetallic element 52 rests with its leg ends 56 disposed on the ramps 36, in spread relation, so that their terminals are disposed in the bottom side corners of the casing. In this condition, the valve is shortest and in its lowermost position in the housing, so that the valve head 42 is partly withdrawn in the valve seat 28, leaving a narrow space surrounding it for the passage of air through the valve seat from the housing to the outlet passages 26 and 30. This position is shown in Fig. 3.

When the bimetal 52 is subjected to heat entering the housing 10, its legs will straighten to become longer, thus tending to move the valve head further into the valve seat toward closing position. At the same time, the leg ends 56 tend to converge toward one another. This will cause them to lengthen further and to ride up the ramps 36, thereby to move the bimetal itself bodily upwardly, to further raise the valve head into the valve seat into valve-closing position, as indicated in Figs. 5 and 9 of the drawing.

The foregoing movements of the bimetal and its leg portions are reversed upon cooling, to open the valve.

This completes the description of the air-escape valve of the present invention. It will be readily apparent that such valve is highly efficient for its purpose, particularly because it utilizes, in part, structural means which aid and magnify the valve-sealing movement of the bimetallic element. It will also be apparent that such valve is made of a minimum number of parts that may be assembled with a minimum of mechanical parts and use of tools, to thereby make its production and assembly highly economical and also providing fewer parts that may be spoiled or get out of order.

It will be further apparent that numerous variations and modifications of the air-escape valve of the present invention may be made by anyone skilled in the art, in accordance with the principles of the invention hereinabove set forth, and without the exercise of any inventive ingenuity. I desire, therefore, to be protected for any and all such variations and modifications that may be made within the spirit of the invention and the scope of the claims hereto appended.

What I claim is:

1. An air escape valve of the character described comprising a casing having an air passageway provided in a wall at one end thereof, said passageway including a valve seat facing the interior of the casing, a valve head, bimetallic means engaging and supporting said valve head within said valve seat for movement in and out of valve-sealing position therein, said bimetallic means comprising a pair of diverging leg portions directed away from said wall, said divergent leg portions connected to one another and supporting said valve head at their converging ends, said leg portions adapted, under the influence of heat, to have their divergent ends move towards one another to thereby elongate said bimetallic means, and means at the opposed end of said casing engaging the end portions of said legs for translating said bimetallic means within said casing toward said wall, as said legs converge toward one another said means engaging the end portions of said legs comprising inwardly and upwardly sloping ramps at said opposed end, each supporting the end portion of one of said legs.

2. The air escape valve of claim 1, wherein means are provided for inter-engaging said end portions of said diverging legs with said ramps against their relative lateral displacement.

3. The air escape valve of claim 1, wherein said inwardly and upwardly sloping ramps are formed integrally with a wall at said opposed end.

4. The air escape valve of claim 1, wherein said inwardly and upwardly sloping ramps are formed integrally with a wall at said opposed end, said ramps being of lesser width than said leg ends, said end portions of said legs having recesses formed therein adapted to engage said ramps to inhibit the lateral displacement of said end portions on said ramps.

5. An air escape valve of the character described comprising a casing having a wall portion at one end thereof, said wall portion having an air passageway provided therethrough, said passageway including a valve seat facing the interior of the casing, a valve head, a bimetallic element engaging and supporting said valve head within said valve seat for movement in and out of valve-sealing position therein, said bimetallic element comprising a pair of divergent leg portions directed away from said wall portion, said divergent leg portions supporting said valve head at their convergent ends, said leg portions having outwardly flaring ends and adapted, under the influence of heat, to have their divergent legs straighten and move towards one another to thereby elongate said bimetallic element, and oppositely directed, inwardly and upwardly sloping ramps at the opposed end of said casing engaging the end portions of said legs for translating said bimetallic element within said casing, towards said wall portion, as said leg ends straighten and converge.

6. The air escape valve of claim 5, wherein said bimetallic element comprises a bimetallic strip bent to substantially a V-shape and having an arcuate apex, said valve head supported on said apex.

7. The air escape valve of claim 5, wherein said ramps are each integrally formed with a casing wall at said opposed end.

8. The air escape valve of claim 5, wherein means are provided on said end portions of said legs and on said ramps for inter-engaging the same against their relative lateral displacement.

9. An air escape valve of the character described, comprising a casing having a wall portion provided with an air passageway therethrough, said passageway having a valve seat formed therein facing the casing interior, a valve head, a bimetallic element adapted to vary its shape under the influence of heat supporting said valve head for movement in and out of valve-sealing position within said valve seat, and ramp means within said casing disposed at an angle to the line of movement of said valve head, slidably movably supporting said bimetallic element for translating the same within said casing relative to said valve seat as said bimetallic element varies its shape.

References Cited in the file of this patent
UNITED STATES PATENTS

| | | |
|---|---|---|
| 574,962 | Auken | Jan. 12, 1897 |
| 1,424,663 | McDonald | Aug. 1, 1922 |
| 1,915,661 | Gibson | June 27, 1933 |
| 1,970,448 | Gibbs | Aug. 14, 1934 |
| 2,494,293 | Gorton | Jan. 10, 1950 |